(12) United States Patent
Feigel

(10) Patent No.: US 7,168,536 B2
(45) Date of Patent: Jan. 30, 2007

(54) BRAKE MASTER CYLINDER COMPRISING PLUNGER PISTONS AND RADIAL GROOVES INSERTED INTO THE HOUSING IN ORDER TO RECEIVE SEALING JOINTS

(75) Inventor: Hans-Jörg Feigel, Rosbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/381,772

(22) PCT Filed: Jul. 21, 2001

(86) PCT No.: PCT/EP01/08441

§ 371 (c)(1),
(2), (4) Date: Mar. 28, 2003

(87) PCT Pub. No.: WO02/09992

PCT Pub. Date: Feb. 7, 2002

(65) Prior Publication Data

US 2004/0011614 A1    Jan. 22, 2004

(30) Foreign Application Priority Data

Jul. 28, 2000  (DE)  ................. 100 37 279
Apr. 27, 2001  (DE)  ................. 101 20 913

(51) Int. Cl.
*B60T 11/20*   (2006.01)
(52) U.S. Cl. .................... 188/345; 60/562; 60/588
(58) Field of Classification Search ........... 188/345, 188/152; 60/562, 581, 585, 588, 591; 277/579, 277/580, 581, 582, 426, 934
See application file for complete search history.

(56) References Cited

U.S. PATENT DOCUMENTS

| 2,569,025 A |   | 9/1951 | Schultz |
| 2,715,555 A | * | 8/1955 | Marien ................... 277/926 |
| 3,887,198 A | * | 6/1975 | McClure et al. ............ 277/926 |

(Continued)

FOREIGN PATENT DOCUMENTS

DE    26 45 992    4/1977

(Continued)

OTHER PUBLICATIONS

International Search Report of PCT/EP01/08441 dated Nov. 30, 2001.

(Continued)

*Primary Examiner*—Thomas Williams
(74) *Attorney, Agent, or Firm*—RatnerPrestia

(57) ABSTRACT

The present invention relates to a tandem master cylinder including two plunger pistons and its object is to design the cylinder as simple as possible and to render its assembly as economical as possible. This object is achieved by inserting circumferential annular grooves directly into the housing of the master cylinder in order to accommodate sealing sleeves, namely both the primary seal and, in an improvement of the invention, the primary seal of the piston at the end of the push rod as well as the secondary seals of both pistons. Collecting annular grooves at the level of the connecting outlets for the compensating reservoir are further favorable aspects of the invention.

12 Claims, 4 Drawing Sheets

U.S. PATENT DOCUMENTS

| | | | | |
|---|---|---|---|---|
| 4,289,264 A | * | 9/1981 | Rawlins | 277/926 |
| 4,337,956 A | * | 7/1982 | Hopper | 277/926 |
| 4,503,677 A | * | 3/1985 | Crumb et al. | 60/562 |
| 4,524,585 A | * | 6/1985 | Coll et al. | 60/562 |
| 4,685,301 A | * | 8/1987 | Bacardit et al. | 60/562 |
| 4,790,138 A | * | 12/1988 | Steer | 60/589 |
| 4,945,728 A | * | 8/1990 | Coleman | 60/562 |
| 4,989,498 A | * | 2/1991 | Mori et al. | 60/562 |
| 5,297,804 A | * | 3/1994 | Siegrist et al. | 277/433 |
| 5,431,014 A | * | 7/1995 | Ishihara | 60/562 |
| 6,012,288 A | * | 1/2000 | Gualdoni et al. | 60/562 |

FOREIGN PATENT DOCUMENTS

| | | |
|---|---|---|
| DE | 41 20 668 C2 | 12/1992 |
| DE | 196 26 926 A1 | 1/1998 |
| JP | 58191662 | 8/1983 |
| WO | WO 97/22505 | 6/1997 |

OTHER PUBLICATIONS

German Search Report dated Jan. 23, 2002.

* cited by examiner

BRAKE MASTER CYLINDER COMPRISING PLUNGER PISTONS AND RADIAL GROOVES INSERTED INTO THE HOUSING IN ORDER TO RECEIVE SEALING JOINTS

This application is a U.S. national-phase application of PCT International Application No. PCT/EP01/08441.

TECHNICAL FIELD

The present invention relates to a master cylinder, preferably a tandem master cylinder, as it is required in hydraulic brake systems. Master cylinders of this type are used as generators for the actuation of the pistons in the brake calipers, with the pedal force exerted by the driver being boosted by a brake booster, as the case may be, and evenly distributed to the brake calipers by way of the generator.

BACKGROUND OF THE INVENTION

A generator of this type is disclosed in U.S. Pat. No. 5,187,934. To insert the sleeve seals into the housing, it was previously customary to close the cylinders by a cover on their end disposed in the actuating direction, while a ring seal was screwed or wedged at the opposite end (on the driver's side) having the purpose of guiding the push rod that points to the driver as well as serving as an abutment for the secondary piston. Although the inside surface of the cylinder does not require special machining, the prior art master cylinders with plunger pistons suffer from a number of disadvantages. The diameter of the master cylinder is of a considerable size because a plurality of parts must be inserted in each other in an axial direction. Further, there is need for a large number of components to provide for the necessary abutment surfaces for the sealing sleeves.

Efforts directed to economizing the closing cap that is positioned in the actuating direction in the mentioned master cylinders become apparent from patent literature (e.g. from EP 1018459, DE-OS 3905917). As a consequence, housings have been step-like expanded towards the driver in order to arrange for the necessary abutment surfaces for the seal.

Partly, no primary sleeves have been inserted in master cylinders of this type. Resiliently preloaded valve members substituted them instead.

BRIEF SUMMARY OF THE INVENTION

Therefore, the present invention is based on a tandem master cylinder (TMC) comprising a housing, a first piston that is linearly slidable in the housing and able to displace pressure medium out of a first chamber, a second piston that is linearly slidable in the housing and able to displace pressure medium out of a second chamber, wherein the first piston on the frontal end in the actuating direction is acted upon by the pressure of the first chamber and on the opposite frontal end is acted upon by the pressure of the second chamber, further comprising a first primary seal sealing the first chamber in relation to the reservoir pressure that prevails in the first reservoir chamber after a flow connection between the first chamber and a first reservoir chamber along the peripheral surface of the first piston has been closed, a second primary seal sealing the second chamber in relation to the reservoir pressure that prevails in the second reservoir chamber after a flow connection between the second chamber and a second reservoir chamber along the peripheral surface of the second piston has been closed, a first secondary seal sealing the second chamber along the peripheral surface of the first piston in relation to the reservoir pressure that prevails in the first reservoir chamber, a second secondary seal sealing the second chamber along the peripheral surface of the second piston in relation to the pressure in the ambience of the TMC. An object of the present invention is to disclose a novel master cylinder of this type that is characterized by the use of very few components and by a very inexpensive design. This object is achieved according to the present invention in that the first primary seal is mounted into a first annular groove directly provided in the housing, and thus, is supported directly on the housing upon pressurization. The main advantage is that the primary seal, which is exposed to considerable forces, can be supported directly on the housing. This means that the forces need not be accommodated by assemblies that must be screwed to or wedged in the housing. This reduces the diameter of the housing to a major extent, while the force input into the master cylinder remains the same. Furthermore, reducing the need for screwing or wedging connections obviates the need for contact points between components inserted into each other, which contact points are susceptible to failure when subjected to permanent load. Manufacturing the necessary annular groove within the housing does not present great difficulties to an automatic milling machine. Further, appropriate devices render it easily possible to insert the annular seal into the so made annular groove.

In a favorable aspect of the present invention the first secondary seal is mounted into a second annular groove directly provided in the housing and, thus, is supported directly on the housing upon pressurization. This is because when a first annular groove is made for the primary seal by means of the mentioned milling tool, said tool may additionally be used for manufacturing a second annular groove that is arranged in an axially offset manner, and the annular secondary seal may then be inserted into said annular groove. This will considerably enhance the advantage achieved in that the first primary seal is mounted into the first annular groove directly provided in the housing and, thus, is supported directly on the housing upon pressurization. It will be appreciated in addition that the overall length of the master cylinder is also reduced due to the omission of components used to support the sealing sleeves, so that the master cylinder will not only have smaller dimensions in diameter but also in length, while its capacity remains constant.

Applying the invention principle to the second secondary seal which seals the ambience of the master cylinder in relation to the second chamber and the compensation reservoir achieves the additional advantage that no special closing part must be inserted at this end of the master cylinder, which would cause an additional increase in the diameter of the master cylinder. Hence, the housing with its seal also serves to support the driver-side second piston of the tandem master cylinder.

Another favorable aspect of the invention is achieved in that the second primary seal is additionally inserted into an annular groove provided in the housing of the master cylinder. All four annular grooves may then be manufactured with the same tool. The same applies to the devices used to fit the annular seals into the associated annular grooves. The material of the housing also limits a possible tilting movement of the second piston that projects into the housing. The master cylinder of the invention may further be simplified in that the housing in the actuating direction has a one-part closed design, and the provision of the annular groove(s) and the assembly of the seals is effected from the opposite side. The housing itself closes the end of the master cylinder lying in the actuating direction. More specifically: no additional cover is needed to close the master cylinder at the actuating end and, thus, form the first chamber in conjunction with the first piston.

To improve the operability of the master cylinder of the invention the primary seal(s) with their sealing lip at the beginning with actuation in the actuating direction can be supported on the inside end surface of the annular groove(s) lying in the actuating direction. In this arrangement, the respective annular groove is inserted into the housing so deep that the primary seals which are considerably pressure-loaded are able to bear with their seals supported at the bottom of the groove against the side wall, when subjected to load. It is reliably prevented this way that the seal's lip will be able to withdraw from the groove under pressure load.

To improve the self-ventilation of at least one chamber in the direction of the outlet towards the wheel, recesses are provided at least in the top area of the chamber(s) and permit or at least improve a self-ventilation in the direction of outlets towards the wheels. It is especially suitable in this case to connect the top area of the annular groove and the primary seal to the aforesaid by way of a flow connection.

To configure a device for anchoring the pistons as an assembly, it is proposed that the springs do not act on the pistons directly, but rather by way of a preferably plate-shaped component transmitting the anchoring force produced by the spring onto the piston. To be able to connect the chambers to the supply reservoir in a simple fashion, it is proposed in a preferred aspect of the invention to arrange the flow connection between the chambers and the reservoir chambers exclusively by way of flow passages in the piston and in the housing, on the one hand. On the other hand, proposals are made to provide a collecting annular groove between the primary seal and the secondary seal at least in the second chamber, and to connect the collecting annular chamber of the first and/or second chamber with the associated compensation reservoir by way of a bore. With respect to at least the second chamber, there may be provision of a cross bore which extends in parallel to the cylinder chamber and is connected to the second chamber by a blind-end bore. The cross bore then leads to a compensation reservoir associated with the second chamber.

DETAILED DESCRIPTION OF THE PREFERRED EMBODIMENTS

Figure 1:
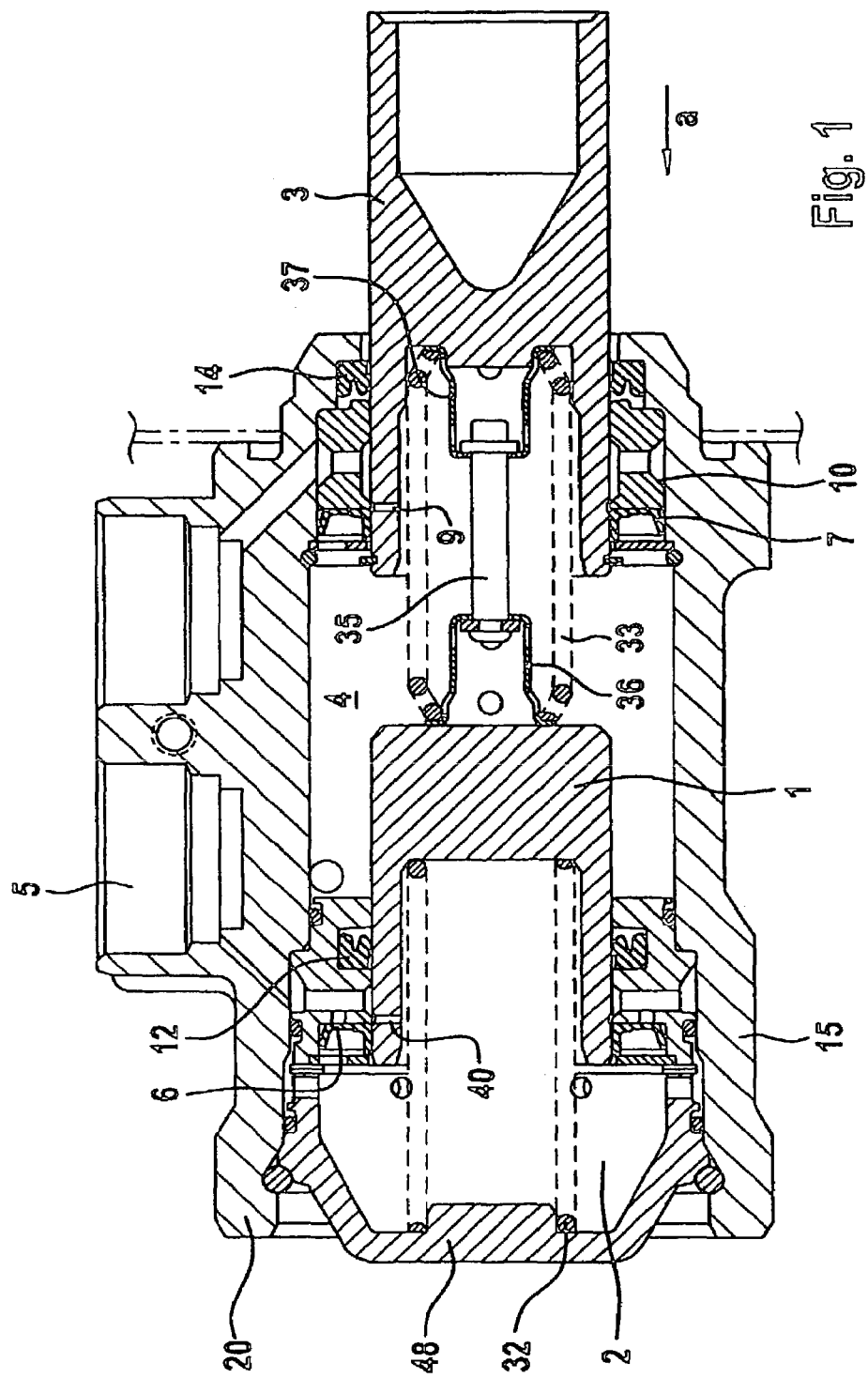
FIG. 1 is a view of a master cylinder furnished with plunger pistons according to the state of the art.

The tandem master cylinder illustrated in FIG. 1 is meant to explain the state of the art and has already been described sufficiently in DE-OS 19527955. Therefore, only the essential features will be explained at this point to make the features of the present invention more conspicuous compared to the state of the art. The tandem master cylinder 20 according to FIG. 1 has a housing 15 closed by a cover 48. Guided in housing 15 are two plunger pistons 1 and 3 being sealed towards the adjoining chambers by a primary seal 6 or 7 and a secondary seal 12 or 14, respectively. The pistons limit a first chamber 2 or a second chamber 4, respectively. Further, a restoring spring 32 or 33, respectively, further acts on the pistons, with restoring spring 33 being captivated by elements 35, 36. To obtain abutment surfaces for the seals 6, 7, 12, 14, several assemblies forming the abutment surfaces for the seals are mounted in the interior of the housing 15.

Figure 2:
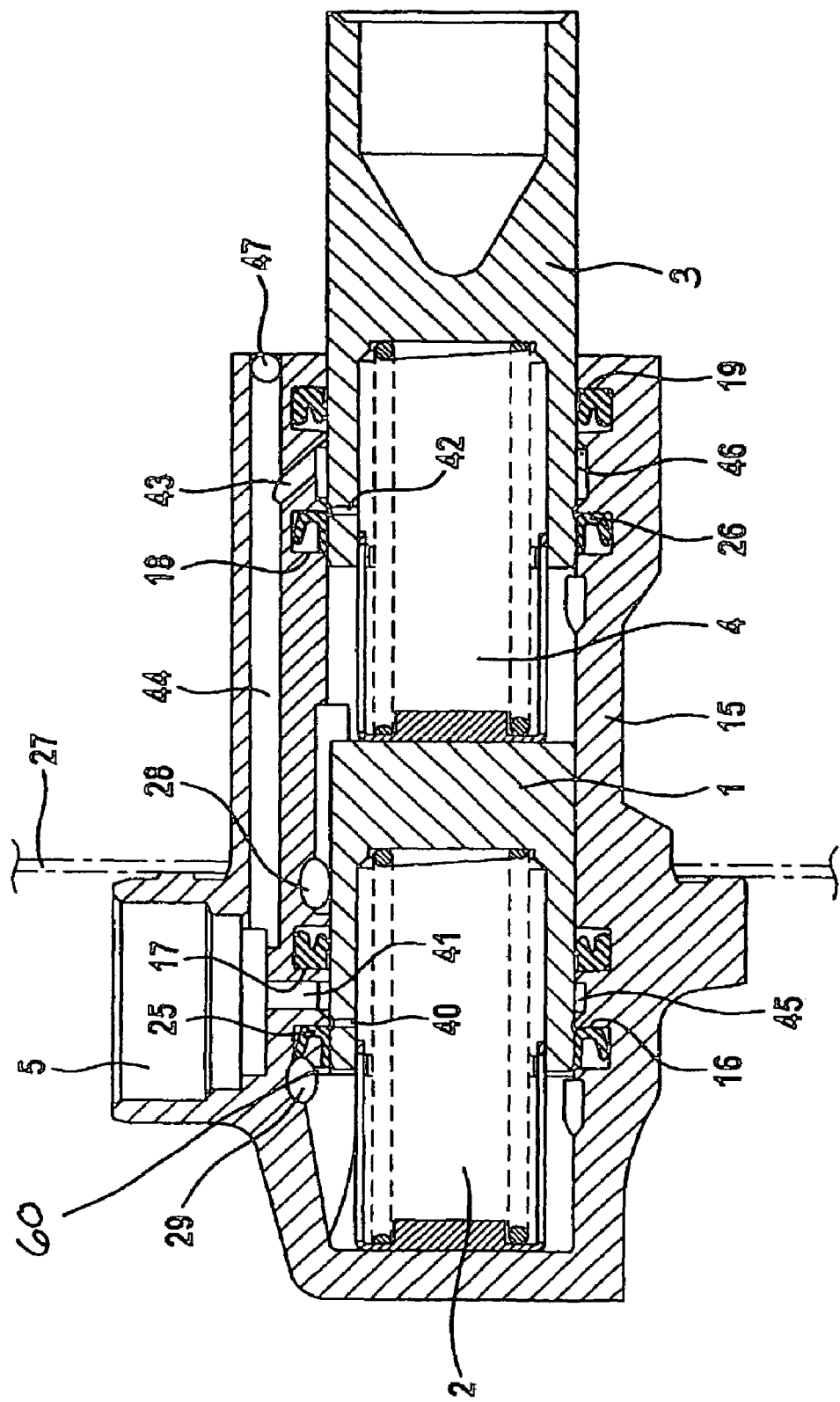
FIG. 2 is a cross-sectional view of a first embodiment for a tandem master cylinder of the invention.
Figure 3:
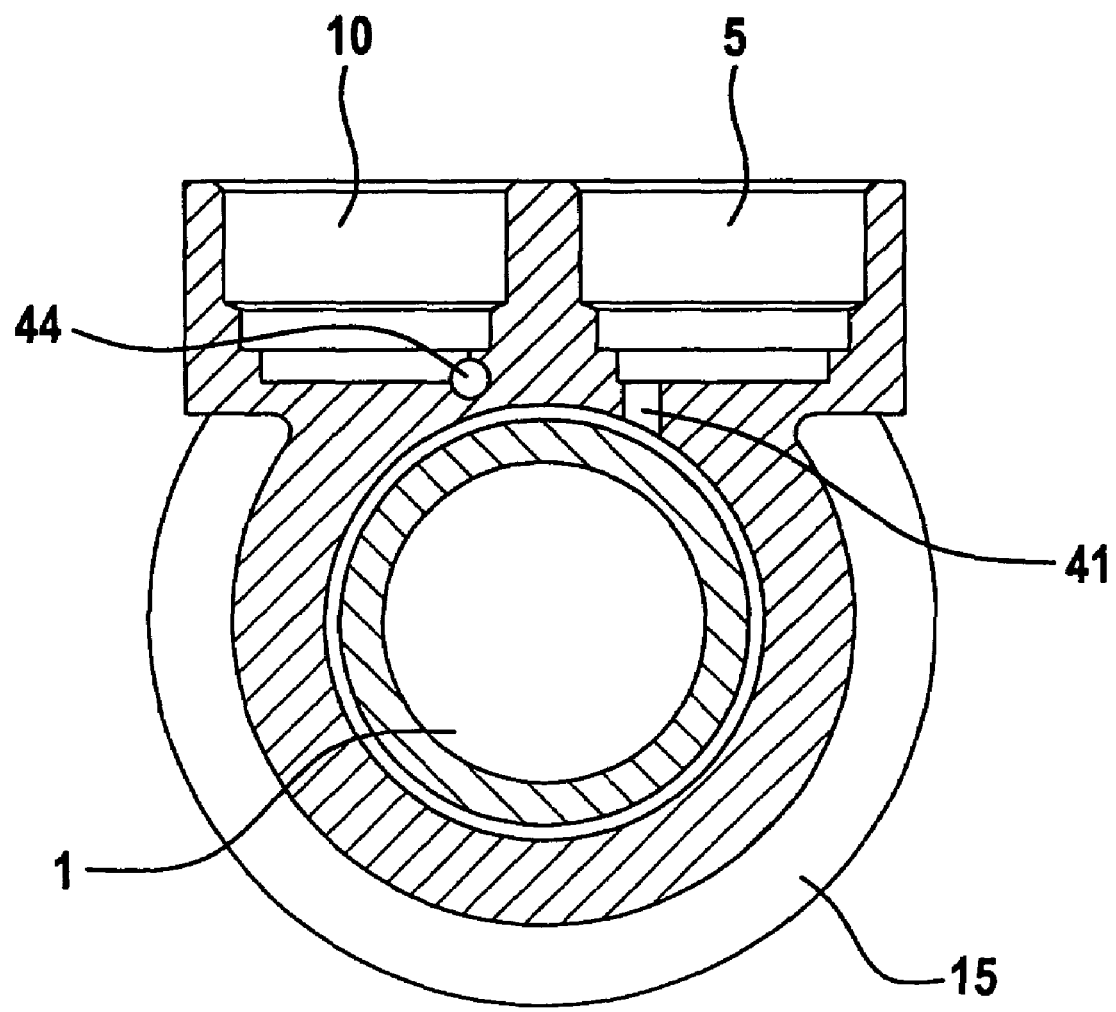
FIG. 3 is a cross-section taken through the master cylinder according to FIG. 2.

It can easily be seen that a major number of components is required for the construction of FIG. 1, with the result of extensive manufacturing and assembling costs. An object of the present invention is to simplify the known tandem master cylinder of FIG. 1. FIG. 2 in conjunction with FIG. 3 shows a first embodiment in this respect. To keep the description short, identical components will not be explained once again in connection with FIGS. 2 to 3 if they have been described already with regard to FIG. 1. It is apparent in the solution of FIG. 2 that the cover 48 of FIG. 1 is omitted. This cover is rather connected integrally with housing 15. Housing 15 is a finished cast piece, and mainly the undercuts must be made by respective milling operations. This applies in particular to the circumferential annular grooves 16 to 19, which accommodate the primary seals and secondary seals. Apart from the economy of additional components which arrange for the abutment of the sealing surfaces, the construction of FIG. 2 is advantageous because the seals can be supported on the inside end surfaces (see e.g. inside end surface 30 represented in FIG. 4), with these inside end surfaces being integrally connected to the housing and able to accommodate correspondingly high forces. What is also typical of the design of FIG. 1 is a circumferential collecting annular groove 45 or 46, respectively inserted between the annular grooves 16, 17 or 18, 19, respectively, into the housing. The annular grooves not only render it possible to deliver fluid largely without pressure to the compensating reservoirs, the gliding quality of the adjacent seals 6, 7 or 12, 14, respectively, is additionally ensured herein. Starting from the collecting annular grooves 45, 46 are bores, and there is provision of a direct bore 41 and a blind-end bore 43 by way of which the first chamber 2 or the second chamber 4, respectively, is connected to the associated reservoir chambers 5 or 10 (see FIG. 3). The blind-end bore 43 in FIG. 2 opens into a cross bore 44 which, in turn, opens into the second reservoir chamber 10 (FIG. 3). Advantageous for the embodiment of the master cylinder according to FIG. 2 are also the flow passages 40 or 42, which make it possible that the chambers 2 or 4 extend into the pistons 1, 2, with the result that the chambers increase despite identical outside dimensions. The flow passages 40, 42 ensure a ventilation of the chamber when the pistons are retracted to the right in the Figure.

It is also essential for the invention that the width of the circumferential annular grooves is a great deal larger than the width of the seals inserted therein. It is thereby possible that pressure fluid may easily propagate to the lip of the individual seals, with the result that the seals are guided in moisture and cannot adhere dryly on the bottoms of the grooves in the housing.

Another favorable feature of the master cylinder of the invention are the recesses 28, 29 arranged in the housing so as to open into the associated chambers on either side of the annular grooves 16, 17. These recesses provided at least in the top area of the chambers permit or at least improve the self-ventilation in the direction of the outlets towards the wheels for both chambers. It is furthermore favorable that the recess 29 disposed in front of the primary seal has a flow connection 60 to the annular groove of the primary seal 16 permitting a self-ventilation in the direction of the outlets towards the wheels and, simultaneously, preventing that the seals run dry.

Further, the design of the master cylinder according to FIG. 2 is characterized by that the two reservoir chambers 5 and 10 (shown in FIG. 3) are arranged side by side transversely relative to the longitudinal axis of the cylinder. This allows saving mounting space with regard to the engine compartment because the master cylinder, as can be seen in FIG. 2, may be fitted much deeper into the splashboard 27 than in the design according to FIG. 1.

Likewise in FIG. 2, the restoring springs (see restoring spring 32 and 33 in FIG. 1) may favorably be configured corresponding to the design of FIG. 1. Preferably, a construction is chosen for the captivation as illustrated in connection with spring 33 in FIG. 1. In this arrangement, two spring plates 36, 37 are interconnected by means of a pin 35, and the maximum distance between the two plates is defined by projections on the pin. At least one of the two spring plates 37 may slide on the pin so that the two spring plates 36, 37 can be moved towards each other in opposition to the force of spring 33. The spring plates are supported directly on the pistons and may be locked or connected with them in any other appropriate fashion.

Figure 4:
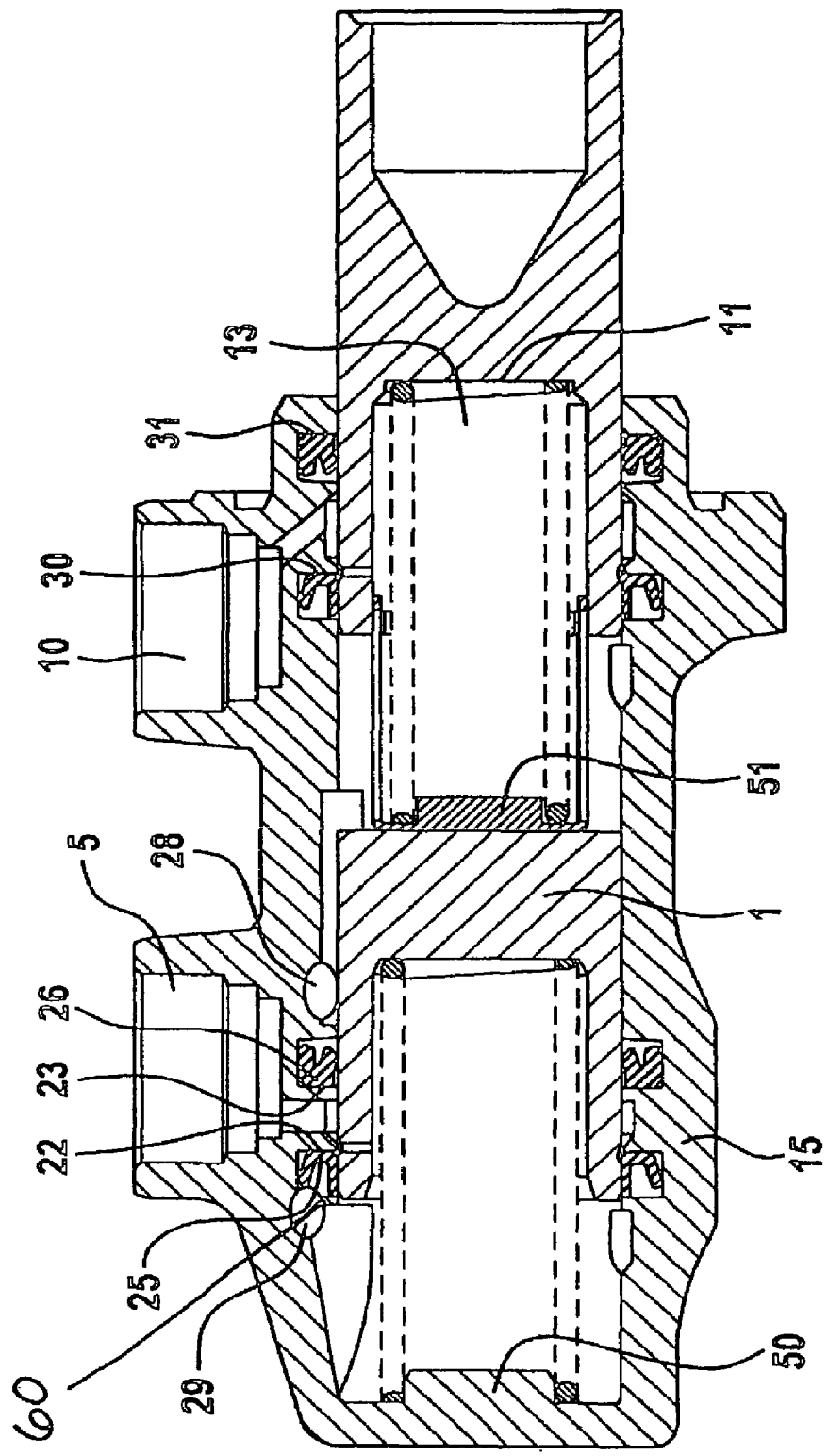
FIG. 4 is a second embodiment for a tandem master cylinder according to the present invention.

The design of FIG. 4 represents another simplification for a tandem master cylinder compared to the design of FIG. 2. The cross bore 44 and the closing element 47 closing said cross bore in relation to the ambience are omitted, and the blind-end bore 43 leads directly into the reservoir chamber 10. In contrast to the embodiment of FIG. 2, the reservoir chambers are now arranged one behind the other in a longitudinal direction of the cylinder axis.

An additional simplification may still be achieved with respect to the restoring springs 32, 33 because the springs are not captivated but make catch directly at the pistons lying opposite each other. In this arrangement, it may be advisable to configure the bottom 11 of the cylinder opening 13 to be suitable for engagement by the spring, or in such a way that the spring is at least retained by static friction. In FIGS. 2 and 4, the end of the spring is arranged in an inclined manner to adapt the gradient of the winding to the bottom so that the force is transmitted precisely along the longitudinal axis of the cylinder. The contact areas 50, 51 at the piston 1 or at the housing 15 may still be furnished with projections for locking engagement by the springs. Another possibility resides in applying the features of FIG. 1 with regard to the restoring springs, as has been explained hereinabove. It is also important for the invention that the seals 6, 7 or 12, 14, respectively, with their sealing lip 25, 26 move into abutment on the inside end surface 22, 23 or 30, 31, respectively, of the associated annular groove 16 to 19 and are supported there. Because said inside end surfaces are integrally connected to the housing 15, they are able to take up considerable forces in a small mounting space.

The invention claimed is:

1. Tandem master cylinder (TMC) comprising a housing, a first piston that is linearly slidable in the housing and able to displace pressure medium out of a first chamber, a second piston that is linearly slidable in the housing and able to displace pressure medium out of a second chamber, wherein the first piston on a frontal end in the actuating direction is acted upon by the pressure of the first chamber and on an opposite frontal end is acted upon by the pressure of the second chamber, further comprising a first primary seal having a lip sealing the first chamber in relation to the reservoir pressure that prevails in a first reservoir chamber after a flow connection between the first chamber and the first reservoir chamber along a peripheral surface of the first piston has been closed, a second primary seal sealing the second chamber in relation to the reservoir pressure that prevails in a second reservoir chamber after a flow connection between the second chamber and the second reservoir chamber along a peripheral surface of the second piston has been closed, a first secondary seal sealing the second chamber along the peripheral surface of the first piston in relation to the reservoir pressure that prevails in the first reservoir chamber, a second secondary seal sealing the second chamber along the peripheral surface of the second piston in relation to the pressure in the ambience of the TMC, wherein the first primary seal is inserted into a first annular groove directly provided in the housing and, thus, is supported directly on the housing upon pressurization, wherein the width of the groove is larger than the width of the first primary seal, enabling pressure fluid to propagate to the lip of the first primary seal and prevent the first primary seal from adhering dryly to the housing, and wherein the flow connections between the chambers and the reservoir chambers are achieved exclusively by way of flow passages in the pistons and the housing.

2. Tandem master brake cylinder as claimed in claim 1, wherein the first secondary seal is mounted into a second annular groove directly provided in the housing and, thus, is supported directly on the housing upon pressurization.

3. Tandem master brake cylinder as claimed in claim 1, wherein the second secondary seal is mounted into a third annular groove directly provided in the housing and, thus, is supported directly on the housing upon pressurization.

4. Tandem master brake cylinder as claimed in claim 1, wherein the second primary seal is mounted into a fourth annular groove directly provided in the housing and, thus, is supported directly on the housing upon pressurization.

5. Tandem master brake cylinder as claimed in claim 1, wherein the housing in the actuating direction has a one-part closed design, and the provision of the annular groove(s) and the assembly of the seals is effected from an opposite side.

6. Tandem master brake cylinder as claimed in claim 1, wherein the seal(s) with a sealing lip at the beginning with actuation in the actuating direction can be supported on an inside end surface of the annular groove(s) lying in the actuating direction.

7. Tandem master brake cylinder as claimed in claim 6, wherein the sealing lip of the seal includes one or more recesses ensuring a flow connection between the chamber and the annular groove in the case of a support on the inside end surface of the annular groove.

8. Tandem master brake cylinder as claimed in claim 1, wherein recesses are provided at least in a top area of the chamber(s) and permit or at least improve a self-ventilation in the direction of outlets towards the wheels.

9. Tandem master brake cylinder as claimed in claim 8, wherein there is a flow connection between the recess and the top area of the annular groove(s) of the primary seal(s) permitting or at least improving a self-ventilation in the direction of outlets towards the wheels.

10. Tandem master brake cylinder as claimed in claim 1 with springs restoring the pistons in opposition to the actuating direction, wherein one of the springs or both springs are captivated, and the captivation is carried out with a component that transmits an anchoring force generated by the spring onto the piston.

11. Tandem master brake cylinder as claimed in claim 9, wherein the flow connection between the first chamber and the first reservoir chamber is established within the housing by way of a direct bore between a first collecting annular groove, which is arranged between the first annular groove of the first primary seal and the annular groove of the first secondary seal, and a first reservoir port.

12. Tandem master brake cylinder as claimed in claim 9, wherein the flow connection between the second chamber and the second reservoir chamber is established within the housing by way of a blind-end bore arranged between a second collecting annular groove and a cross bore which, in turn, is connected to a second reservoir port.

* * * * *